US012664917B2

(12) United States Patent
Yokota et al.

(10) Patent No.: US 12,664,917 B2
(45) Date of Patent: Jun. 23, 2026

(54) DISPLAY DEVICE

(71) Applicant: Panasonic Intellectual Property Management Co., Ltd., Osaka (JP)

(72) Inventors: Kiyoshi Yokota, Osaka (JP); Kenta Nakanishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/944,864

(22) Filed: Nov. 12, 2024

(65) Prior Publication Data

US 2025/0239188 A1 Jul. 24, 2025

(30) Foreign Application Priority Data

Jan. 19, 2024 (JP) ................................ 2024-006687

(51) Int. Cl.
*G09G 5/00* (2006.01)
*G09F 9/30* (2006.01)
*G09F 9/302* (2006.01)

(52) U.S. Cl.
CPC ............ *G09F 9/3023* (2013.01); *G09F 9/301* (2013.01)

(58) Field of Classification Search
CPC ........ G09G 9/301; G09G 9/3023; G09G 5/00; G02F 1/133308; G02F 1/133314; G02F 1/133317; G02F 1/13332; G02F 1/133331; G02F 2201/50
See application file for complete search history.

(56) References Cited

U.S. PATENT DOCUMENTS 8,508,673 B2 8/2013 Perlman et al.
8,786,796 B2 * 7/2014 Ito .................... G02F 1/133308 349/60
8,897,018 B2 * 11/2014 Suwa ............... G02F 1/133308 361/728

(Continued)

FOREIGN PATENT DOCUMENTS

CN 206058030 3/2017
JP 9-149346 6/1997

(Continued)

OTHER PUBLICATIONS

Extended European Search Report issued May 2, 2025 in corresponding European Patent Application No. 24210512.0.

(Continued)

*Primary Examiner* — Joe H Cheng
(74) *Attorney, Agent, or Firm* — Wenderoth, Lind & Ponack, L.L.P.

(57) ABSTRACT

A display device for use in an aircraft includes a first panel that is light-transmissive, a second panel that opposes a first back surface that is a back surface of the first panel, a housing, and a shielding component. The second panel displays an image on a second front surface, and includes a glass substrate. The housing defines a housing space that houses the second panel, and includes a side wall that supports a peripheral portion of the first panel. A shielding component includes one end connected to the peripheral portion of the first panel. The shielding component includes a portion that extends backward from the peripheral portion in an interior of the housing space.

6 Claims, 8 Drawing Sheets

(56) References Cited

U.S. PATENT DOCUMENTS

| | | | | |
|---|---|---|---|---|
| 9,002,419 | B2 * | 4/2015 | Satou | G06F 3/041 455/90.3 |
| 10,551,654 | B2 * | 2/2020 | Jung | G02F 1/133608 |
| 10,593,731 | B2 * | 3/2020 | Kim | H01L 23/40 |
| 11,657,743 | B2 * | 5/2023 | Tanaka | G09G 3/04 345/214 |
| 2011/0279747 | A1 | 11/2011 | Saiki et al. | |
| 2012/0249458 | A1 * | 10/2012 | Okazaki | G06F 3/0446 345/173 |
| 2012/0287066 | A1 | 11/2012 | Yang et al. | |
| 2014/0184956 | A1 | 7/2014 | Satou | |
| 2020/0409499 | A1 | 12/2020 | Ogura et al. | |

FOREIGN PATENT DOCUMENTS

| | | |
|---|---|---|
| JP | 2004-297488 | 10/2004 |
| JP | 2011-257742 | 12/2011 |
| JP | 2014-160473 | 9/2014 |
| JP | 2014-235512 | 12/2014 |
| JP | 3197676 | 5/2015 |

OTHER PUBLICATIONS

Communication pursuant to Article 94(3) EPC dated Feb. 26, 2026 in corresponding European Patent Application No. 24210512.0.

* cited by examiner

DISPLAY DEVICE

CROSS REFERENCE TO RELATED APPLICATION

The present application is based on and claims priority of Japanese Patent Application No. 2024-006687 filed on Jan. 19, 2024. The entire disclosure of the above-identified application, including the specification, drawings and claims is incorporated herein by reference in its entirety.

FIELD

The present disclosure relates to a display device.

BACKGROUND

Patent Literature (PTL) 1 discloses a display panel unit. The display panel unit includes a display panel that includes a liquid crystal display (LCD) panel, a touch panel with an outline for which at least a portion of the outline is larger than that of the display panel, and a frame that includes a first housing part, which houses the display panel, and a second housing part, in which the touch panel and the display panel are stacked and housed. The frame has a bottom surface and side surfaces that rise from edges of the bottom surface, and form a box-shape with a top surface that is open. Upper portions of the side surfaces are provided with a stepped structure so as to protrude outward. Of the inner spaces defined by the bottom surface and the side surfaces, spaces defined by portions other than the bottom surface and the upper portions of the side surfaces are included in a first housing portion, and of the inner spaces, spaces other than the first housing portion are included in a second housing portion.

CITATION LIST

Patent Literature

PTL 1: Japanese Unexamined Patent Application Publication No. 2011-257742

SUMMARY

Technical Problem

In the above-mentioned, conventional display panel unit, in the touch panel disposed on the front of the display panel, the edges of the touch panel are attached to the frame by double-sided tape on the stepped portions provided on the side surfaces of the frame. In a display panel unit with such a structure, when the touch panel is subjected to a strong impact from the front, for example, the edges of the touch panel may become detached from the frame or glass components included in the display panel may become damaged. In this case, a large number of fine glass shards (glass debris) may be scattered about due to this damage, and such glass debris may be allowed to escape from gaps between the edges of the touch panel and the frame. In order to prevent this, the edges of the touch panel can conceivably be made more difficult to detach from the frame by increasing the adhesion area between the edges of the touch panel and the frame. However, in the current situation, as the slimming down of bezels is a demand being placed on such display devices as the above-mentioned display panel unit, in order to meet this demand, it is difficult to increase the size of the adhesion area. In particular, since an aircraft is prone to being subjected to unpredictable turbulence, and the like, during flight, when excessive impact is applied on the display device used in the aircraft, a problem arises in determining how to prevent the above-mentioned glass debris from escaping outside of the display device.

The present disclosure has been conceived by the inventors as a novel approach for solving the above-mentioned problem, and provides a display device for which safety is improved.

Solution to Problem

A display device according to one aspect of the present disclosure is a display device for use in an aircraft, and the display device includes: a first panel that is light-transmissive; a second panel that opposes a first back surface that is a back surface of the first panel and displays an image on a front surface of the second panel, the second panel including a glass substrate; a housing that defines a housing space and includes a side wall that supports a peripheral portion of the first panel, the housing space housing the second panel; and a shielding component that includes one end connected to the peripheral portion of the first panel, the shielding component including a portion that extends backward from the peripheral portion in an interior of the housing space.

Advantageous Effects

The present disclosure can provide a display device for which safety is improved.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
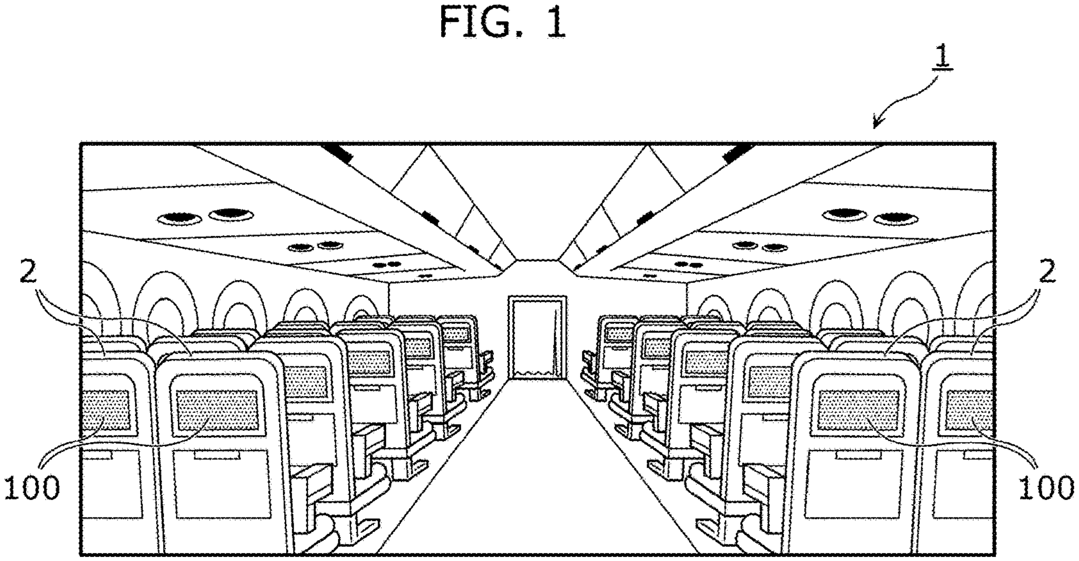
FIG. 1 is a drawing illustrating an example of an arrangement of a plurality of display devices according to an embodiment.

A display device according to a first aspect of the present disclosure is a display device for use in an aircraft, and the display device includes: a first panel that is light-transmissive; a second panel that opposes a first back surface that is a back surface of the first panel and displays an image on a front surface of the second panel, the second panel including a glass substrate; a housing that defines a housing space and includes a side wall that supports a peripheral portion of the first panel, the housing space housing the second panel; and a shielding component that includes one end connected to the peripheral portion of the first panel, the shielding component including a portion that extends backward from the peripheral portion in an interior of the housing space.

In the display device according to the above-mentioned first aspect, even in a case where the peripheral portion of the first panel detaches from the housing, and the glass substrate of the second panel cracks due to excessive impact, the shielding component that includes the portion that extends backward is provided in the peripheral portion of the first panel. Accordingly, glass debris is prevented from escaping out of the housing through a gap between the peripheral portion of the first panel and the housing. Consequently, the display device according to this aspect is a display device for which safety is improved.

A display device according to a second aspect of the present disclosure is the display device according to the above-mentioned first aspect, wherein an other end of the shielding component may be positioned behind a second back surface that is a back surface of the second panel.

Accordingly, in the display device according to the above-mentioned second aspect, since the length of the shielding component in the front-and-back direction is relatively large, in a case where the peripheral portion of the first panel becomes detached from the housing, glass debris can reliably be prevented from escaping through the gap between the peripheral portion and the housing.

A display device according to a third aspect of the present disclosure is the display device according to the above-mentioned second aspect, wherein the housing may include an opposing wall that opposes the second back surface, and the other end may be disposed between the second back surface and the opposing wall.

In the display device according to the above-mentioned third aspect, the shielding component is provided in a size that allows it to reach from the peripheral portion of the first panel to the back surface of the second panel (the second back surface). Accordingly, the advantageous effect in which glass debris is prevented from escaping, by the shielding component, through the gap between the peripheral portion of the first panel and the housing is further improved.

A display device according to a fourth aspect of the present disclosure is the display device according to the above-mentioned third aspect, wherein the shielding component may include: a shock-absorbing component that is a portion that extends backward from the peripheral portion; and a tabular component connected to the shock-absorbing component, the tabular component including the other end.

In the display device according to the above-mentioned fourth aspect, when the first panel deforms due to excessive impact, the shock-absorbing component more readily follows this deformation. Accordingly, a failure such as where the shielding component detaches from the peripheral portion due to such deformation, for example, is less likely to occur. In other words, the advantageous effect in which glass debris is prevented from escaping by the shielding component is more reliably achieved.

A display device according to a fifth aspect of the present disclosure is the display device according to any one of the above-mentioned first through fourth aspects, wherein the shielding component may be disposed in at least one of the peripheral portion in an upper edge of the first panel or the peripheral portion in a lower edge of the first panel.

In the display device according to the above-mentioned fifth aspect, the shielding component is disposed in at least one of an upper or lower edge of the horizontally long first panel, for example, which are portions that are prone to detaching from the housing. Accordingly, the advantageous effect in which glass debris is prevented from escaping by the shielding component is further improved.

A display device according to a sixth aspect of the present disclosure is the display device according to the above-mentioned fifth aspect, wherein the housing may include two attachment portions that are portions to which an other object that is positioned behind the housing is attached, the two attachment portions may be spaced apart from each other in a left-and-right direction, and a range of placement of the shielding component in the left-and-right direction may include a range spanning between the two attachment portions in the left-and-right direction.

In the display device according to the above-mentioned sixth aspect, the shielding component is disposed in a range in which the first panel is susceptible to deforming due to external force applied from the front. Consequently, the advantageous effect in which glass debris is prevented from escaping by the shielding component is further improved.

A display device according to a seventh aspect of the present disclosure is the display device according to the above-mentioned fifth aspect or sixth aspect, wherein the shielding component may be disposed across a range at least ⅓ and at most ½ a length of the housing in a left-and-right direction, the range including a central portion of the housing in the left-and-right direction.

In the display device according to the above-mentioned seventh aspect, the shielding component is disposed in a range centered on a central portion, which is a portion in the first panel that is prone to detaching from the housing. Accordingly, glass debris is more efficiently prevented from escaping, by the shielding component, through the gap between the peripheral portion of the first panel and the housing.

A display device according to an eighth aspect of the present disclosure is the display device according to any one of the above-mentioned first through seventh aspects, wherein an other end of the shielding component may be a free end.

In the display device according to the above-mentioned eighth aspect, since the shielding component need only be connected to the peripheral portion of the first panel, the display device that includes the shielding component can easily be assembled.

Additional benefits and advantages in one aspect of the present disclosure will become apparent from the description and the drawings. While such benefits and advantages are yielded by configurations of some embodiments and configurations described in the description and the drawings, not all configurations are necessary.

Hereinafter, an embodiment will be described in detail with reference to the drawings. The embodiment described below merely illustrates general or specific examples of the present disclosure. The numerical values, shapes, materials, elements, the arrangement and connection states of the elements, steps, the order of the steps, etc., described in the following embodiment are mere examples, and are therefore not intended to limit the present disclosure. Accordingly, among elements in the following embodiment, those not appearing in any of the independent claims that indicate the broadest concepts of the present disclosure will be described as optional elements. The figures are schematic diagrams and are not necessarily precise illustrations. In the figures, elements that are essentially the same are given the same reference numbers.

EMBODIMENT

1. Arrangement Example of Display Device 100

FIG. 1 is a drawing illustrating an example of an arrangement of a plurality of display devices 100 according to an embodiment. In the present embodiment, display device 100 is attached to each of a plurality of seats 2 that are arranged in a cabin of aircraft 1. In other words, display device 100 is attached to the rear of a seat back of seat 2. Display device 100 that is attached to seat 2 faces toward a seat to the rear that is another seat 2 immediately behind seat 2, and is viewed by a passenger seated in the seat to the rear. Such a display device 100 is used by the passenger in the seat to the rear. Display device 100 may be capable of being detached and attached to seat 2 by the passenger. For example, a passenger seated in a given seat 2 may detach display device 100 that is disposed to the front and may perform handheld operation.

2. Outline of Configuration of Display Device 100

Figure 2:
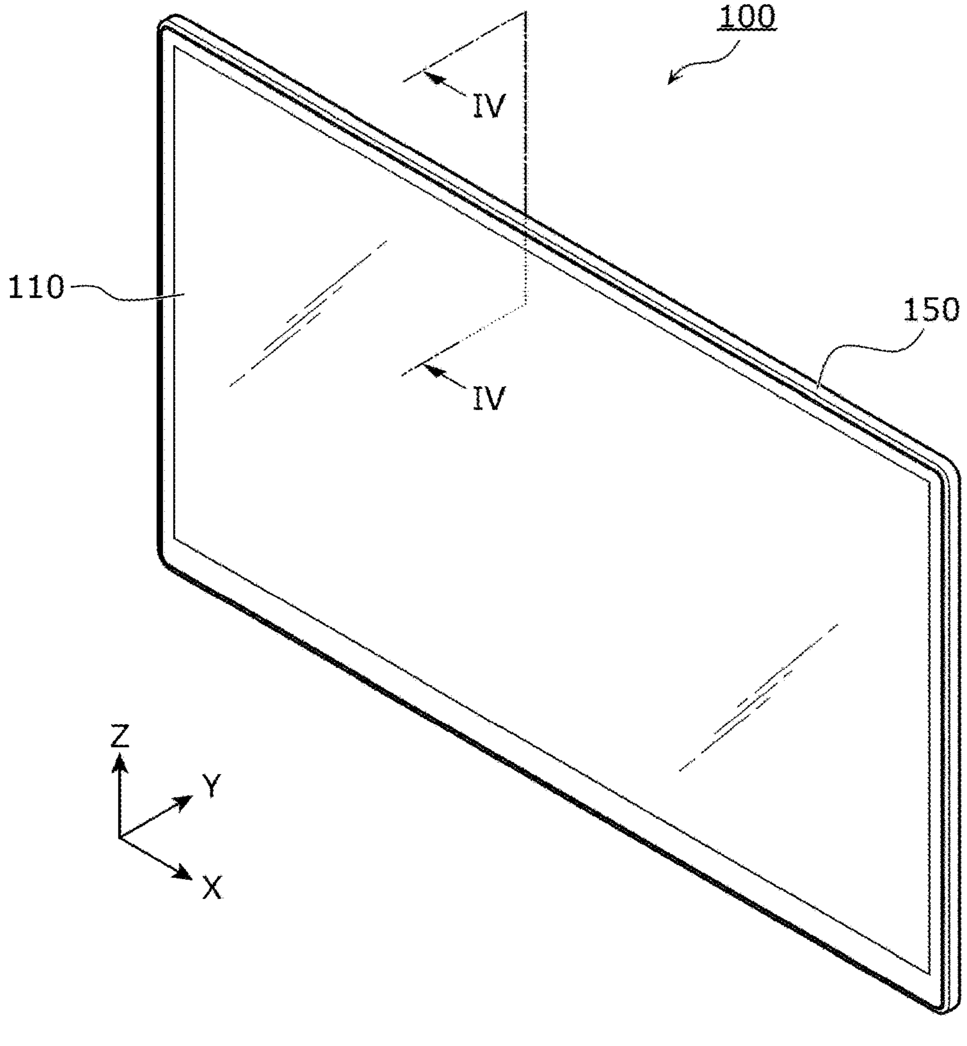
FIG. 2 is a perspective view illustrating an appearance of the display device according to the embodiment.
Figure 3:
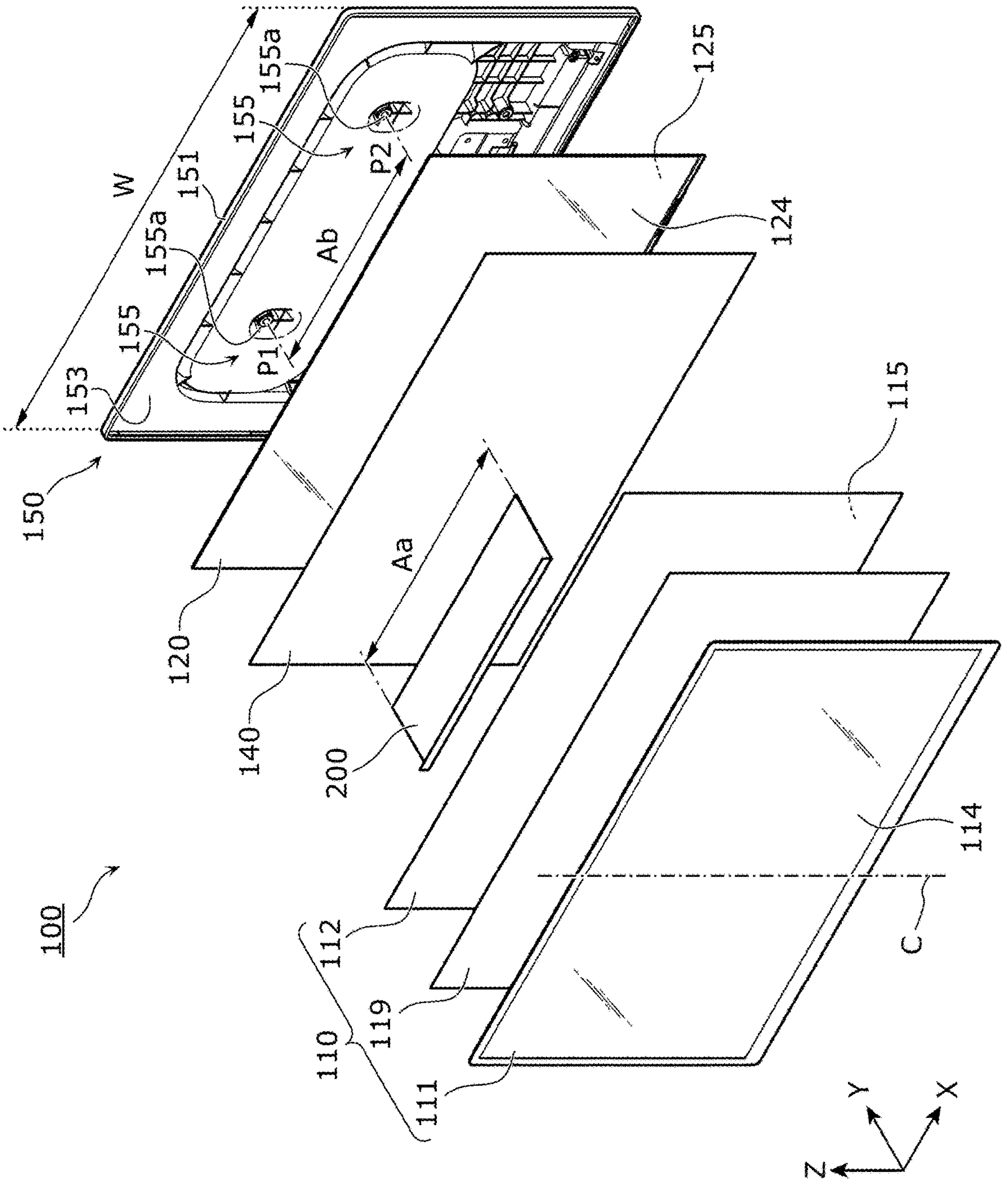
FIG. 3 is an exploded perspective view of the display device according to the embodiment.

FIG. 2 is a perspective view illustrating an appearance of display device 100 according to the embodiment. FIG. 3 is an exploded perspective view of display device 100 according to the embodiment. In the present embodiment, as illustrated in FIG. 2 and FIG. 3, a direction in which display device 100 displays an image is described as the negative side of the Y-axis direction, the left-and-right direction is described as the X-axis direction, and the up-and-down direction is described as the Z-axis direction. In other words, in the following description of the outline of display device 100, "forward" refers to the negative side of the Y-axis direction, and "backward" refers to the positive side of the Y-axis direction, for example. The orientation of display device 100 during use is not particularly limited, and display device 100 may be disposed in a predetermined location so as to display an image downward, diagonally downward, upward, or diagonally upward.

As illustrated in FIG. 2 and FIG. 3, display device 100 according to the embodiment includes first panel 110, second panel 120, housing 150, and shielding component 200. In the present embodiment, first panel 110 is a touch panel that is light-transmissive, and second panel 120 is a display panel that displays an image. First panel 110 includes first front surface 114 that faces forward and first back surface 115 that faces backward. Second panel 120 includes second front surface 124 that faces forward and second back surface 125 that faces backward.

As illustrated in FIG. 2, first panel 110 includes front surface panel 111 that forms first front surface 114 of first panel 110, sensor panel 112 that detects contact by a person's finger by a predetermined method, such as an electrostatic-capacitive method, and adhesive component 119 that bonds front surface panel 111 and sensor panel 112. Front surface panel 111, sensor panel 112, and adhesive component 119 are light-transmissive to a predetermined extent. Accordingly, a person disposed in front of display device 100 can view, through first panel 110, an image displayed on second panel 120 that is disposed so as to oppose first back surface 115 of first panel 110. In the present embodiment, front surface panel 111 is, for example, a tabular component made of a transparent resin, such as acrylic resin or the like. Adhesive component 119 is, for example, a transparent adhesive that is referred to as optical clear adhesive (OCA). Sensor panel 112 is, for example, a component on which a plurality of electrodes, for detecting a location that has been touched on a base material made of resin, are disposed.

A detection result of first panel 110 that is a touch panel is transmitted, via electrical wires not illustrated in the drawings, to a control circuit (not illustrated in the drawings) that controls image display of second panel 120 that is a display panel. The control circuit can control display of an image in second panel 120 in accordance with the detection result.

In the present embodiment, an organic electroluminescence (EL) display panel, for example, is used as second panel 120 that is a display panel. In the present embodiment, second front surface 124 of second panel 120 is bonded to first back surface 115 of first panel 110 by adhesive component 140. In the same manner as adhesive component 119, adhesive component 140 is, for example, an optical clear adhesive (OCA). A more specific configuration of second panel 120 will later be described with reference to FIG. 4.

In this manner, when viewing first panel 110 and second panel 120 that are bonded together by adhesive component 140, from the negative side of the Y-axis direction (hereinafter also referred to as a "front view"), the size of first panel 110 is larger than the size of second panel 120. In other words, in a front view, peripheral portion **110*a* of first panel 110 protrudes out from second panel 120. By attaching peripheral portion 110*a* to side wall 151 of housing 150, first panel 110 and second panel 120 are attached to housing 150. The state in which peripheral portion 110*a* is attached to side wall 151 will later be described with reference to FIG. 4**.

Housing 150 is a component that holds first panel 110 and second panel 120, and is fabricated, for example, by resin molding. Housing 150 includes opposing wall 153, which opposes second back surface 125 of second panel 120, and side walls 151 that protrude forward from peripheral edges of opposing wall 153. In the present embodiment, two attachment portions 155 are provided in opposing wall 153 of housing 150. Two attachment portions 155 are spaced apart from each other in the left-and-right direction as illustrated in FIG. 3. Two attachment portions 155 each include an attachment hole **155*a*. In each of the two attachment holes 155*a*, a shaft (bolt or the like) is inserted that connects housing 150 to seat 2 (see FIG. 1) or a fixing component, which is interposed between seat 2 and housing 150. Accordingly, display device 100 is attached to seat 2 directly or via the fixing component. It should be noted that at least a portion of second back surface 125 of second panel 120 may be connected to opposing wall 153 of housing 150 by adhesive or the like. The material that housing 150 is made of is not limited to resin, and housing 150** may be made of a metal, such as aluminum, aluminum alloys, or the like, for example.

In display device 100 configured in this manner, shielding component 200 that extends backward is disposed on the peripheral portion of first panel 110. Accordingly, when second panel 120 that is a display panel is damaged due to excessive impact, glass debris that is generated due to this damage can be prevented from escaping through a gap between peripheral portion 110*a* of first panel 110 and housing 150. Hereinafter, shielding component 200 in display device 100 and a configuration of the surroundings of shielding component 200 will be described with reference to FIG. 4 through FIG. 6.

Note that in a case where the base material of sensor panel 112 includes glass, as is described later, glass debris generated due to damage of sensor panel 112, as well as damage of second panel 120, can be prevented (not illustrated in the drawings) from escaping through the gap between peripheral portion 110*a* of first panel 110 and housing 150.

3. Configuration of Shielding Component 200 and Surroundings

Figure 4:
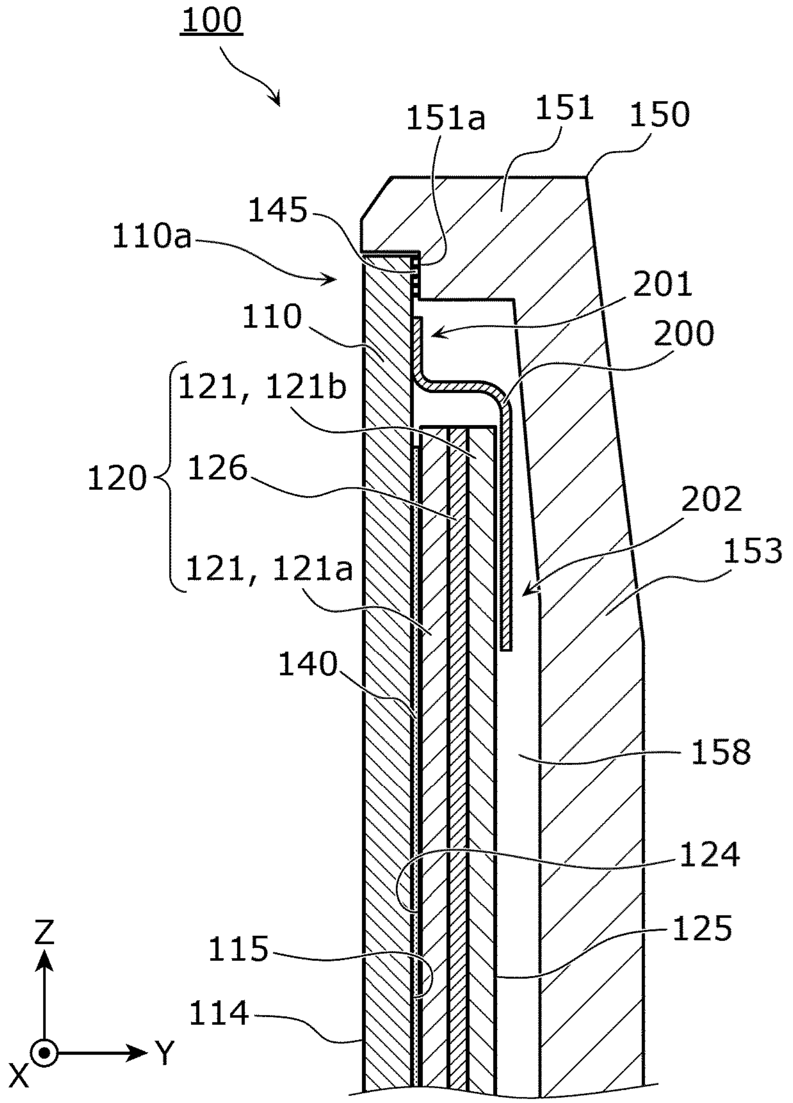
FIG. 4 is a cross-sectional view illustrating a shielding component of the display device according to the embodiment and a configuration of the surroundings of the shielding component.
Figure 5:
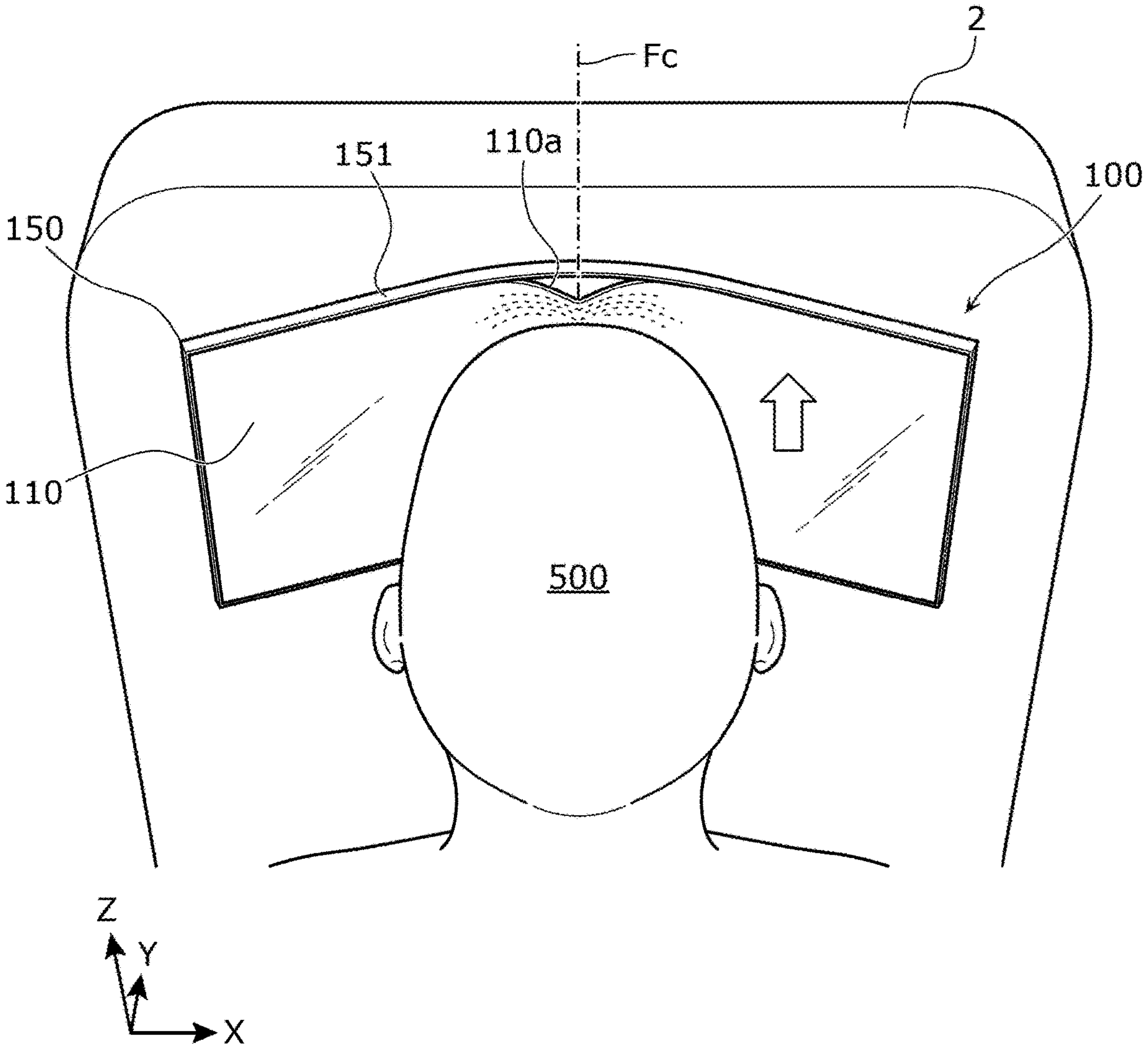
FIG. 5 is a drawing schematically illustrating an example of a state in which the display device according to the embodiment is subjected to excessive impact.
Figure 6:
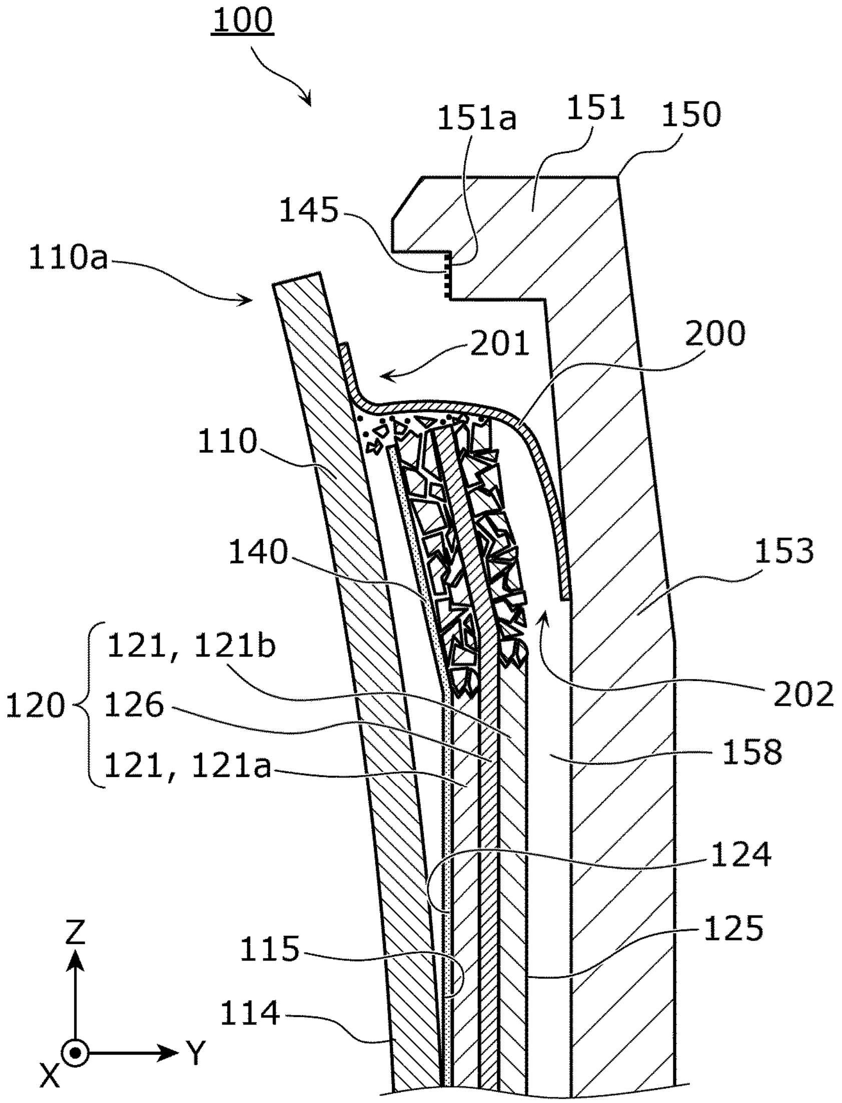
FIG. 6 is a cross-sectional view schematically illustrating a state in which part of a peripheral portion of a first panel according to the embodiment becomes detached from a housing.

FIG. 4 is a cross-sectional view illustrating shielding component 200 of display device 100 according to the embodiment and a configuration of the surroundings of shielding component 200. FIG. 4 schematically illustrates a portion of a cross section of display device 100 that is parallel to plane YZ and passes through line IV-IV in FIG. 2. FIG. 5 is a drawing schematically illustrating an example of a state in which display device 100 according to the embodiment is subjected to excessive impact. FIG. 6 is a cross-sectional view schematically illustrating a state in which part of peripheral portion 110*a* of first panel 110 according to the embodiment becomes detached from housing 150. The positions in the cross section in FIG. 6 correspond to the positions in the cross section in FIG. 4. In FIG. 4 and FIG. 6, for the sake of simplicity, first panel 110 is illustrated as a single structure that includes front surface panel 111, adhesive component 119, and sensor panel 112.

As illustrated in FIG. 4, second panel 120, which is an organic EL display in the embodiment, includes glass substrate 121 and organic EL element 126. More specifically, second panel 120 includes a pair of glass substrates 121, which oppose each other in the front-and-back direction, and organic EL element 126 that is disposed between the pair of glass substrates 121. When differentiating between the pair of glass substrates 121, the glass substrate 121 in front is referred to as glass substrate 121*a*, and the glass substrate 121 in back is referred to as glass substrate 121*b*. Glass substrate 121*a* is a color filter (CF) substrate that is a glass substrate that forms a color filter, for example. Glass substrate 121*b* is a thin-film transistor (TFT) substrate that is a glass substrate on which various elements, such as gate electrodes and the like are layered, for example. Organic EL element 126 is a light-emitting portion that includes an anode that is a lower electrode, an EL layer that is a light-emitting layer made of organic materials, and a cathode that is a transparent upper electrode.

In the present embodiment, second front surface 124 of second panel 120 is formed by the front surface of glass substrate 121*a*, and second back surface 125 of second panel 120 is formed by the back surface of glass substrate 121*b*. It should be noted that an optical component, such as a polarizing panel, or the like, may be disposed on second front surface 124 of second panel 120. Furthermore, a heat-dissipating component provided as a metal foil, such as copper foil may be disposed on second back surface 125 of second panel 120. In the present embodiment, illustration and description of such optical components and heat-dissipating components are omitted.

As illustrated in FIG. 4, peripheral portion 110*a* of first panel 110 is supported by side wall 151 of housing 150. Specifically, side wall 151 includes support surface 151*a* that faces forward, and support surface 151*a* and first back surface 115 on peripheral portion 110*a* of first panel 110 are connected by adhesive component 145, which is double-sided tape or an adhesive or the like. More specifically, in the embodiment, side wall 151 is arranged in a rectangular-ring shape in the front view as illustrated in FIG. 3. The entire area (or roughly entire area) of peripheral portion 110*a* of first panel 110 and rectangular-ring shaped side wall 151 are connected via adhesive component 145. In other words, the entire area (or roughly entire area) of peripheral portion 110*a* of first panel 110 is supported by housing 150. In the present embodiment, since second panel 120 is affixed to the first back surface of first panel 110 via adhesive component 145, housing 150 supports both first panel 110 and second panel 120.

In display device 100 configured in this manner, the base material of front surface panel 111 of first panel 110 and sensor panel 112 of first panel 110 are made of resin. Consequently, when first panel 110 is, for example, subjected to excessive impact due to a collision from the front with an object or the like, first panel 110 deforms as illustrated in FIG. 5 and FIG. 6.

Specifically, when display device 100 is attached to the back surface of seat 2 (see FIG. 1) of aircraft 1, for example, display device 100 is disposed in front of a passenger that sits in a seat 2 that is behind the previously mentioned seat 2. In this state, when aircraft 1 significantly sways or suddenly decelerates, or the like, there is a risk that head 500 of the passenger may collide with display device 100. More specifically, it is estimated that head 500 will collide at a position that is in a central portion of display device 100 in the left-and-right direction, and that is closer to an upper edge rather than the center in the up-and-down direction, for example. In this case, first panel 110 that is primarily made of resin deforms such that portions at which head 500 collide are caused to recede backward as schematically illustrated in FIG. 5. Accordingly, a portion of peripheral portion 110*a* located in the upper edge of the central portion of first panel 110 deforms so as to protrude forward from side wall 151 of housing 150. More specifically, when the portions that head 500 collide with deform so as to recede backward, portions surrounding the recessed portions are caused to deform by becoming displaced forward relative to the center of the recessed portions. Accordingly, in the upper edge of the central portion of first panel 110, a portion that detaches from side wall 151 of housing 150 deforms so as to protrude forward. Here, since portions on both sides to the left and the right of the portion of first panel 110 that has detached are still bonded to side wall 151, distortion becomes concentrated at the portion that has detached. As a result, as illustrated in FIG. 5, the portion of first panel 110 that has detached protrudes in a mountain-like manner with a peak at central portion Fc in the left-and-right direction.

In other words, although peripheral portion 110*a* of first panel 110 is bonded to support surface 151*a* of side wall 151 by adhesive component 145, as described earlier, a force that exceeds the adhesive strength of adhesive component 145 is exerted on peripheral portion 110*a*, and as a result, peripheral portion 110*a* detaches from support surface 151*a*. In other words, as illustrated in FIG. 5 and FIG. 6, a gap is formed between peripheral portion 110*a* in the upper edge of the central portion of first panel 110 and housing 150 (or more specifically, side wall 151 of housing 150).

When first panel 110 is caused to deform due to such excessive impact, second panel 120 behind first panel 110 becomes damaged due to first panel 110 directly colliding with second panel 120 from the front. Specifically, as schematically illustrated in FIG. 6, for example, at least a portion of glass substrate 121 that is included in second panel 120 becomes shattered, and as a result, a plurality of glass debris that are shards of glass are caused to scatter. Since glass debris of a size of about a few millimeters or no more than 1 mm is included among the plurality of glass debris, there is a risk that such glass debris will escape out of the gap between peripheral portion 110*a* of first panel 110 and housing 150. When such fine glass debris is allowed to escape from display device 100, such fine glass debris may further worsen the situation.

As illustrated in FIG. 3 and FIG. 4, since adhesive component 140 is affixed to second front surface 124 of second panel 120 that is a display panel, when the glass substrate 121*a* located in front among the pair of glass substrates 121 becomes damaged due to impact, there is a possibility that adhesive component 140 may prevent glass debris from being scattered. However, as illustrated in FIG. 4, adhesive component 140 does not reach the top edge of glass substrate 121*a*, and no component is present to cover the upper edge surface of glass substrate 121*a*. Consequently, at the very least, it can be said that it is difficult to prevent glass debris from being scattered from the upper edge (includes the upper edge surface) of glass substrate 121*a* by using adhesive component 140.

Furthermore, metal foil, such as copper foil or the like, as described earlier, may be provided on second back surface 125 of second panel 120. In this case, when the glass substrate 121*b* located in back among the pair of glass substrates 121 is damaged due to impact, there is a possibility that the metal foil may prevent scattering of glass debris. However, the metal foil does not cover up to the upper edge of glass substrate 121*b*. For this reason, at the very least it can be said that it is difficult to prevent glass debris from being scattered from the upper edge surface of glass substrate 121*b* by using metal foil.

In this manner, when excessive impact is applied to second panel 120 that includes one or more glass substrates 121, fine glass debris is scattered, and there is a risk that the glass debris scattered will escape out of the gap between peripheral portion 110*a* and housing 150. In view of this, in display device 100 according to the embodiment, shielding component 200 that extends backward is disposed in peripheral portion 110*a* of first panel 110 as illustrated in FIG. 4 and FIG. 6. In other words, one end 201 (more specifically, one end 201 toward the front) of shielding component 200 is connected to peripheral portion 110*a* of first panel 110. Shielding component 200 prevents glass debris from escaping out of the gap between peripheral portion 110*a* of first panel 110 and housing 150.

It should be noted that the base material of sensor panel 112 may be made of glass. In this case, shielding component 200 may be connected to front surface panel 111.

The technical characteristics of display device 100 according to the embodiment are described as follows, for example. It should be noted that the position and state of each element as described below refer to the positions and states during typical use of display device 100. In other words, when some form of object collides with display device 100, there are cases where the positions and states, and the like, given in the following description may not apply.

Display device 100 according to the embodiment is a display device for use in aircraft 1. Display device 100 includes first panel 110 that is light-transmissive, second panel 120 that opposes first back surface 115 that is a back surface of first panel 110, housing 150, and shielding component 200. Second panel 120 displays an image on a front surface (second front surface 124), and includes glass substrate 121. Housing 150 defines housing space 158 that houses second panel 120, and includes side wall 151 that supports peripheral portion 110*a* of first panel 110. Shielding component 200 includes one end 201 connected to peripheral portion 110*a* of first panel 110. Shielding component 200 includes a portion that extends backward from peripheral portion 110*a* in an interior of housing space 158.

In display device 100 configured in this manner, even in a case where glass substrate 121 of second panel 120 were to crack due to excessive impact, for example, and peripheral portion 110*a* of first panel 110 were to become detached from housing 150, shielding component 200 that includes a portion that extends backward is disposed in peripheral portion 110*a* of first panel 110. Accordingly, glass debris is prevented from escaping out of housing 150 through a gap between peripheral portion 110*a* of first panel 110 and housing 150. Consequently, display device 100 according to the embodiment is a display device for which safety is improved.

Specifically, in the present embodiment, a sheet-like or film-like component made of resin, such as polyethylene terephthalate (PET), polypropylene (PP), polyethylene (PE), polystyrene (PS), and the like is used in shielding component 200. Consequently, flexibility of shielding component 200 is relatively high. Furthermore, although the method for connecting one end 201 of shielding component 200 and first panel 110 is not particularly limited, one end 201 of shielding component 200 is bonded to peripheral portion 110*a* in first back surface 115 of first panel 110 by an adhesive or double-sided tape, for example. It should be noted that although shielding component 200 according to the embodiment is not electrically connected to first panel 110, a component that establishes an electrical connection with first panel 110 may be used as a shielding component. A configuration that uses, as a shielding component, a component that establishes an electrical connection with first panel 110, will later be described in Variation 2 of the embodiment.

In the present embodiment, more specifically, one end 201 of shielding component 200 is connected to peripheral portion 110*a*, in a predetermined direction orthogonal to the front-and-back direction, of first panel 110, and shielding component 200 includes a portion disposed to the side, in the predetermined direction, of second panel 120. For example, in FIG. 4, one end 201 of shielding component 200 is connected to peripheral portion 110*a* in an upper edge of first panel 110, and shielding component 200 includes a portion disposed above second panel 120.

More specifically, in the present embodiment, other end 202 of shielding component 200 is positioned behind second back surface 125 that is a back surface of second panel 120.

In this manner, in the present embodiment, a length of shielding component 200 in the front-and-back direction is relatively long. Accordingly, in a case where peripheral portion 110*a* of first panel 110 becomes detached from housing 150, glass debris can reliably be prevented from escaping through a gap between peripheral portion 110*a* and housing 150.

The position of other end 202 of shielding component 200 according to the embodiment will be described as follows, for example. Housing 150 includes opposing wall 153 that opposes second back surface 125. Other end 202 of shielding component 200 is disposed between second back surface 125 and opposing wall 153.

In this manner, in the present embodiment, shielding component 200 is of a size that allows it to reach from peripheral portion 110*a* of first panel 110 to the back surface of second panel 120 (second back surface 125). Accordingly, the advantageous effect of preventing the escape of glass debris through the gap between peripheral portion 110*a* of first panel 110 and housing 150 is further improved. In other words, even in a case where the width of the gap in the front-and-back direction becomes large, since the length that shielding component 200 extends from first panel 110 is relatively long, the probability that shielding component 200 will cover the gap in the front-and-back direction is high.

In the present embodiment, as illustrated in FIG. 3, FIG. 4, and FIG. 6, shielding component 200 is disposed in peripheral portion 110*a* in an upper edge of first panel 110.

In the present embodiment, first panel 110 is horizontally long and rectangular in shape, and consequently, the upper and lower edges of first panel 110 are considered to be portions susceptible to becoming detached from housing 150. Consequently, as described in display device 100 according to the embodiment, by disposing shielding component 200 in peripheral portion 110*a* in the upper edge of first panel 110, the advantageous effect of preventing glass debris from escaping through the gap between peripheral portion 110*a* of first panel 110 and housing 150 is improved. In particular, as illustrated in FIG. 5, when there is a high probability that an external object will collide at a location of first panel 110 that is closer to the upper edge rather than the center in an up-and-down direction, it is useful to dispose shielding component 200 in peripheral portion 110*a* in the upper edge of first panel 110.

For the same reason, for example, when there is high probability that an external object will collide at a location of first panel 110 closer to the lower edge rather than the center in the up-and-down direction, shielding component 200 may be disposed in peripheral portion 110*a* in the lower edge of first panel 110. Accordingly, the advantageous effect of preventing glass debris from escaping through the gap between peripheral portion 110*a* of first panel 110 and housing 150 is improved.

In the present embodiment, a range of placement of shielding component 200 in a left-and-right direction will be described as follows, for example. In other words, in display device 100 according to the embodiment, housing 150 includes two attachment portions 155 that are portions to which an other object is attached. The other object is positioned behind the housing (see FIG. 3). Two attachment portions 155 are spaced apart from each other in the left-and-right direction. A range of placement of shielding component 200 in the left-and-right direction includes a range spanning between the two attachment portions 155. For example, as illustrated in FIG. 3, here it is assumed that P1 is the position at which left attachment portion 155 is located, and P2 is the position at which right attachment portion 155 is located, in the left-and-right direction (X-axis direction). It should be noted, for example, that the positions of attachment portions 155 are defined with reference to the center of each attachment hole 155*a* included in each attachment portion 155. Furthermore, when a range between P1 and P2 in the left-and-right direction is defined as range Ab, range of placement Aa of shielding component 200, in the left-and-right direction, includes at least range Ab.

In the present embodiment, as described earlier, attachment portions 155 are attached to seat 2 (see FIG. 1) or a fixing component fixed to seat 2. Consequently, the two attachment portions 155 are two points at which display device 100 is fixed, and relative to the entirety of display device 100, range Ab between the two attachment portions 155 are portions that are susceptible to deforming in a backward direction due to external force applied from the front. Consequently, when an object collides with any portion of range Ab in the left-and-right direction from the front of display device 100 (for example, see FIG. 5), the probability becomes high that deformation of first panel 110 in range Ab will be severe. As a result, the gap between peripheral portion 110*a* and housing 150, in range Ab, may become large. In regard to this point, in display device 100 according to the embodiment, shielding component 200 is disposed in a range in which first panel 110 is susceptible to deforming due to external force applied from the front. Specifically, range of placement Aa of shielding component 200, in the left-and-right direction, includes range Ab spanning between two attachment portions 155. Consequently, as an advantageous effect of shielding component 200, the effectiveness of shielding component 200 in preventing glass debris from escaping through the gap between peripheral portion 110*a* of first panel 110 and housing 150 is improved.

Furthermore, the length, in the left-and-right direction, of shielding component 200 according to the embodiment is described below. That is to say, in display device 100 according to the embodiment, shielding component 200 is disposed across a range at least ⅓ and at most ½ of length W (see FIG. 3) of housing 150 in a left-and-right direction. The range includes central portion C of housing 150 (see FIG. 3) in the left-and-right direction. Note that in the present embodiment, the position of central portion C of housing 150 in the left-and-right direction coincides with the central portion of first panel 110 in the left-and-right direction and the central portion of second panel 120 in the left-and-right direction.

In this manner, in the present embodiment, shielding component 200 is disposed in a range centered on a central portion in which first panel 110 is susceptible to becoming detached from housing 150. Accordingly, the escape of glass debris through the gap between peripheral portion 110*a* of first panel 110 and housing 150 can be more efficiently prevented. More specifically, from the perspective of more reliably preventing glass debris from escaping through the gap between peripheral portion 110*a* and housing 150, the length of shielding component 200 in the left-and-right direction can conceivably be made approximately equal to the overall length of housing 150 in the left-and-right direction, for example. In other words, a shielding component 200 having a length that is the same as the overall length of the upper edge of first panel 110 in the left-and-right direction can conceivably be provided on the upper edge of first panel 110, for example. However, in this case, it is difficult to accurately bond shielding component 200 to first panel 110, for example. Furthermore, when in a state where shielding component 200 is attached to first panel 110, work to attach first panel 110 to housing 150 becomes complex. Moreover, it is also problematic that manufacturing costs of shielding component 200 increase. In regard to these points, in the present embodiment, the length of shielding component 200 in the left-and-right direction is at least ⅓ and at most ½ of length W of housing 150 in a left-and-right direction. Furthermore, range of placement Aa of shielding component 200 in the left-and-right direction is a range that includes central portion C of housing 150 in the left-and-right direction. Accordingly, the escape of glass debris through the gap between peripheral portion 110*a* of first panel 110 and housing 150 can be prevented while also preventing the difficulty of assembly (manufacturing) of display device 100 from increasing.

In the present embodiment, other end 202 of shielding component 200 is a free end. In other words, while one end 201 of shielding component 200 is connected to peripheral portion 110*a* of first panel 110, other end 202, which is an end on the opposite side of one end 201 of shielding component 200, is not fixed to any component included in display device 100.

In this manner, since shielding component 200 need only be connected to peripheral portion 110*a* of first panel 110, display device 100 that includes shielding component 200 can be easily assembled.

It should be noted that other end 202 of shielding component 200 may, for example, be fixed to second back surface 125 of second panel 120 (see FIG. 4) with an adhesive or the like. With this, the orientation of shielding component 200 is made to be stable. Accordingly, when in a state where second panel 120 and shielding component 200 are attached to first panel 110, work for attaching first panel 110 to housing 150 becomes easier, for example.

When fixing other end 202 of shielding component 200 to second panel 120, as described earlier, the bond strength between one end 201 of shielding component 200 and first panel 110 may be stronger than the bond strength between other end 202 and second panel 120. In other words, when peripheral portion 110*a* of first panel 110 becomes detached from side wall 151 of housing 150 (see FIG. 5 and FIG. 6), one end 201 of shielding component 200 may move forward so as to follow peripheral portion 110*a*, from the perspective of covering the gap that may allow glass debris to escape. Consequently, in a case where the length with which shielding component 200 extends from peripheral portion 110*a* is relatively short, and where peripheral portion 110*a* is caused to move forward, other end 202, among the two fixing locations of shielding component 200 (one end 201 and other end 202), may become detached first. This is also the same when other end 202 of shielding component 200 is fixed to housing 150 with an adhesive or the like.

Although display device 100 according to the embodiment has been described above, configurations of display device 100 are not limited to the configuration described in the above embodiment. In view of this, variations of configurations of display device 100 will be described with a focus on differences with the above embodiments.

4-1. Variation 1

Figure 7:
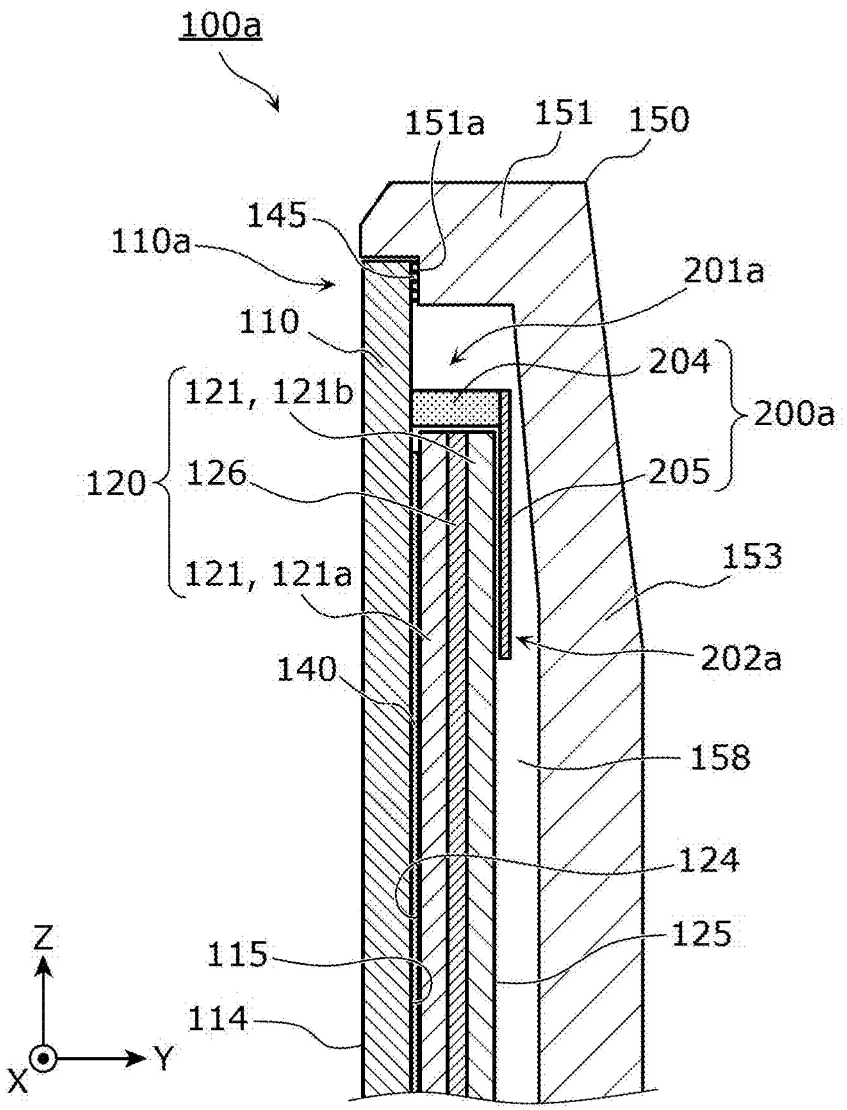
FIG. 7 is a cross-sectional view illustrating a shielding component of a display device according to Variation 1 of the embodiment and a configuration of the surroundings of the shielding component.

FIG. 7 is a cross-sectional view illustrating shielding component 200*a* of display device 100*a* according to Variation 1 of the embodiment and a configuration of the surroundings of shielding component 200*a*. The positions in the cross section in FIG. 7 correspond to the positions in the cross section in FIG. 4.

As illustrated in FIG. 7, shielding component 200*a* according to the present variation includes one end 201*a* that is connected to peripheral portion 110*a* of first panel 110, and a portion that extends backwards from peripheral portion 110*a* in the interior of housing space 158. Furthermore, other end 202*a* of shielding component 200*a* is positioned behind second back surface 125 that is the back surface of second panel 120. In regard to these points, shielding component 200*a* according to the present variation, and shielding component 200 according to the embodiment are the same.

Shielding component 200*a* according to the present variation includes two components, thus differentiating it from shielding component 200 according to the embodiment. Specifically, shielding component 200*a* according to the present variation includes shock-absorbing component 204 that is a portion that extends backward from peripheral portion 110*a*, and tabular component 205 that includes other end 202*a*. Tabular component 205 is connected to shock-absorbing component 204. In the present variation, shock-absorbing component 204 is a sponge made of polyurethane foam or the like, for example. Tabular component 205 is, for example, a sheet-like or film-like component made of resin, such as PET, PP, or the like, in the same manner as shielding component 200 according to the embodiment.

In this manner, in the present variation, the portion in shielding component 200*a* connected to peripheral portion 110*a* of first panel 110 is shock-absorbing component 204 that is implemented as a sponge or the like. Accordingly, when first panel 110 deforms due to excessive impact, as illustrated in FIG. 5, shock-absorbing component 204 more readily follows this deformation. Consequently, a failure such as where shielding component 200*a* detaches from peripheral portion 110*a* due to such deformation, for example, is less likely to occur. In other words, an advantageous effect in which glass debris is prevented from escaping by shielding component 200*a* is more reliably achieved. Furthermore, tabular component 205, which is a relatively thin component is included as a component that forms other end 202*a* of shielding component 200*a*. Accordingly, the portion that includes other end 202*a* of shielding component 200*a* can be disposed in a reasonable manner in the narrow space between second back surface 125 of second panel 120 and opposing wall 153 of housing 150.

4-2. Variation 2

Figure 8:
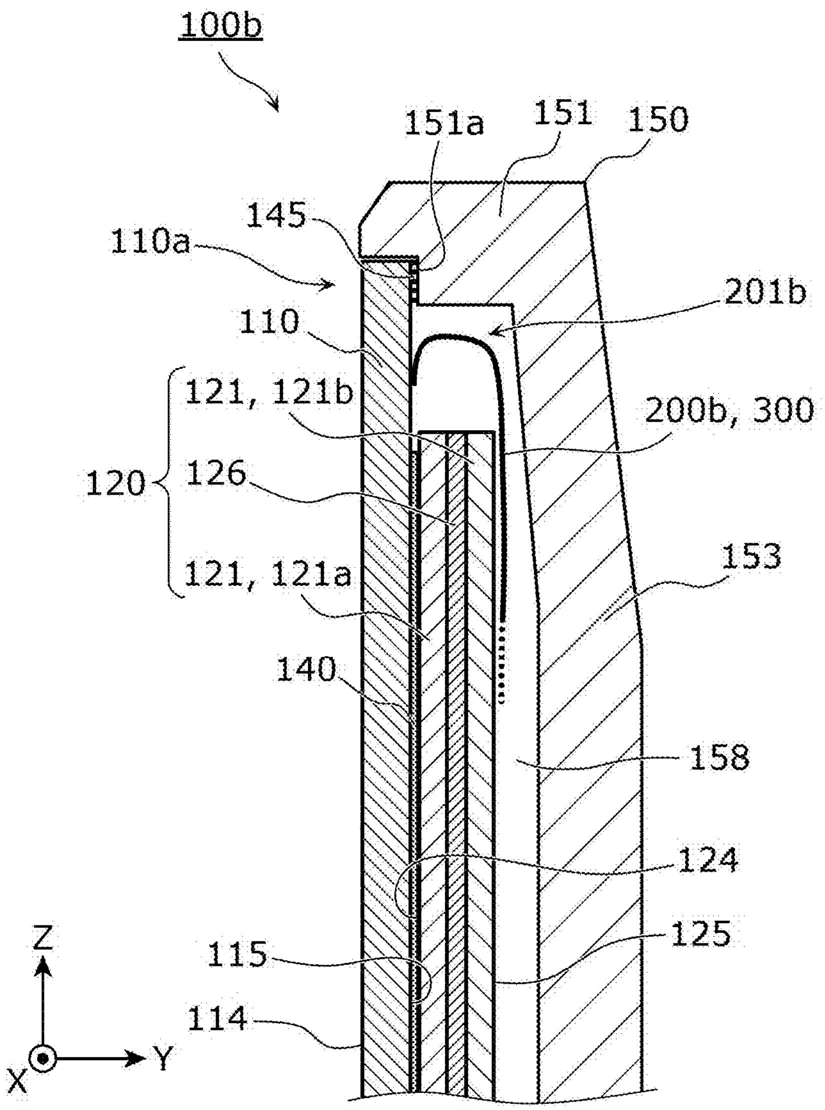
FIG. 8 is a cross-sectional view illustrating a shielding component of a display device according to Variation 2 of the embodiment and a configuration of the surroundings of the shielding component.

FIG. 8 is a cross-sectional view illustrating shielding component 200*b* of display device 100*b* according to Variation 2 of the embodiment and a configuration of the surroundings of shielding component 200*b*. The positions in the cross section in FIG. 8 correspond to the positions in the cross section in FIG. 4.

As illustrated in FIG. 8, shielding component 200*b* according to the present variation includes one end 201*b* that is connected to peripheral portion 110*a* of first panel 110, and a portion that extends backwards from peripheral portion 110*a* in the interior of housing space 158. In regard to this point, shielding component 200*b* according to the present variation, and shielding component 200 according to the embodiment are the same.

Shielding component 200*b* according to the present variation includes an electrical wire electrically connected to first panel 110, and is implemented by wiring component 300 that is highly flexible, thus differentiating it from shielding component 200 according to the embodiment. Wiring component 300 is, for example, a component referred to as a flexible printed circuit (FPC), and has a configuration in which an electrical wire is sandwiched between thin insulating materials.

Wiring component 300 is, for example, electrically connected to sensor panel 112 (see FIG. 3) included in first panel 110. Sensor panel 112 can exchange information (electrical signals) with a control circuit (not illustrated in the drawings) that controls image display performed for second panel 120 via wiring component 300.

In this manner, in display device 100*b* that includes first panel 110, which is a touch panel, wiring component 300 that includes an electrical wire electrically connected to first panel 110 is used as shielding component 200*b*. Accordingly, a simplified configuration of display device 100*b* that includes shielding component 200*b* is achieved that can prevent glass debris from escaping.

4-3. Variation 3

Figure 9:
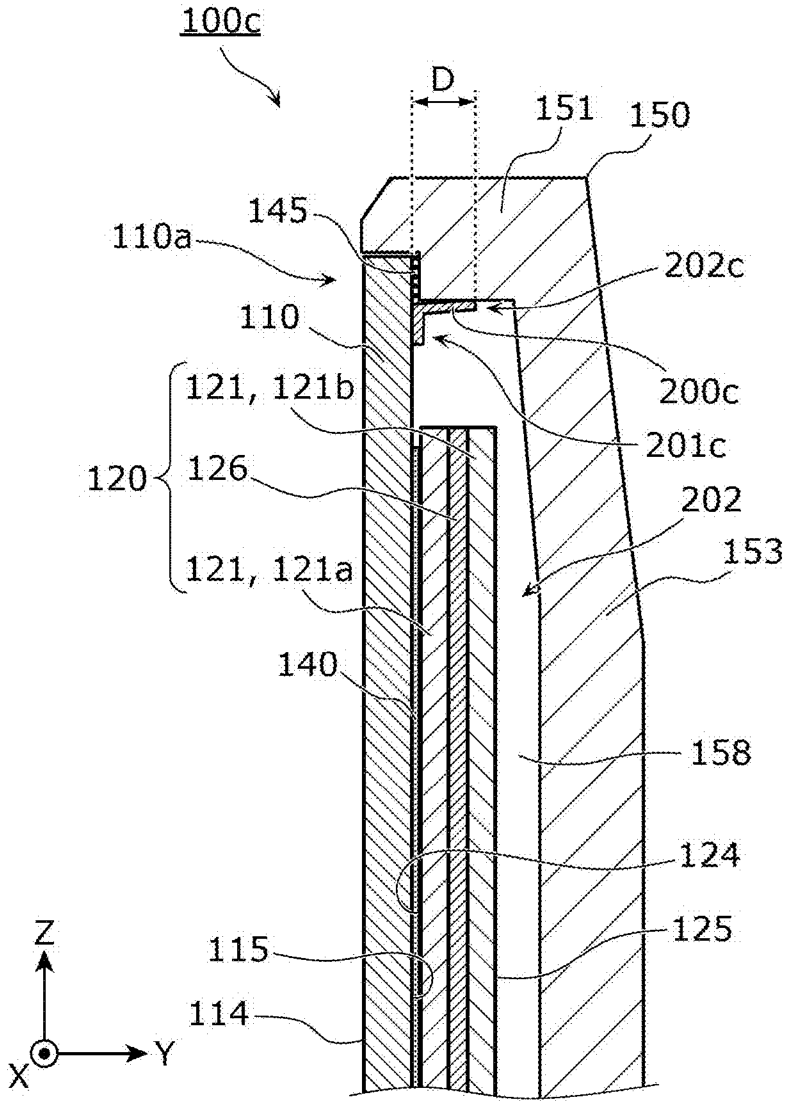
FIG. 9 is a cross-sectional view illustrating a shielding component of a display device according to Variation 3 of the embodiment and a configuration of the surroundings of the shielding component.

FIG. 9 is a cross-sectional view illustrating shielding component 200*c* of display device 100*c* according to Variation 3 of the embodiment and a configuration of the surroundings of shielding component 200*c*. The positions in the cross section in FIG. 9 correspond to the positions in the cross section in FIG. 4.

As illustrated in FIG. 9, shielding component 200*c* according to the present variation includes one end 201*c* that is connected to peripheral portion 110*a* of first panel 110, and a portion that extends backwards from peripheral portion 110*a* in the interior of housing space 158. In regard to this point, shielding component 200*c* according to the present variation, and shielding component 200 according to the embodiment are the same. In other words, in shielding component 200*c* according to the present variation, one end 201*c* is connected to peripheral portion 110*a* in a predetermined direction (upward in FIG. 9) orthogonal to the front-and-back direction of first panel 110. Furthermore, shielding component 200*c* includes a portion disposed to the side, in the predetermined direction, of second panel 120.

In shielding component 200*c* according to the present variation, other end 202*c* of shielding component 200*c* is disposed forward of second back surface 125, which is the back surface of second panel 120, in the front-and-back direction, thus differentiating it from shielding component 200 according to the embodiment. In other words, shielding component 200*c* according to the present variation has a length D extending in a direction away from peripheral portion 110*a* that is shorter when compared to shielding component 200 according to the embodiment.

In this manner, even if length D of shielding component 200*c* is relatively short, as long as the distance of the gap between peripheral portion 110*a* and housing 150 formed due to collision with an object or the like, for example, is shorter than length D, shielding component 200*c* can cover the gap in the front-and-back direction. Furthermore, even if the gap between peripheral portion 110*a* and housing 150 were to become large to the point where other end 202*c* of shielding component 200*c* becomes externally exposed (i.e., the distance of the gap is greater than D), glass debris is prevented from escaping by shielding component 200*c* that stands on peripheral portion 110*a* of first back surface 115.

Other Embodiments

Although a display device according to the present disclosure is described above based on the above-mentioned embodiment and variations of the embodiment, the present disclosure is not limited to the above-mentioned embodiment and variations of the embodiment.

In the present embodiment, second panel 120 may, for example, be a type of display panel that is different from an organic electroluminescence (EL) display panel. For example, a liquid crystal display (LCD) panel may be used as second panel 120. An LCD panel includes a glass substrate that includes a pair of transparent electrodes that sandwich a liquid crystal layer. Accordingly, when an LCD panel is subjected to excessive impact, the glass substrate that includes the transparent electrodes becomes damaged, and fine glass debris may thereby be generated. Consequently, the structure that can prevent glass debris from escaping outside that is included in display device 100 according to the above embodiment is also useful in a case where second panel 120 is an LCD panel.

Shielding component 200 need not be a sheet-like or film-like component made of resin, such as PET, PP, or the like. For example, the sponge that forms shock-absorbing component 204 included in shielding component 200*a* according to Variation 1, which is a sponge that has a thickness of an extent to which it is not generally recognized as a sheet-like or film-like component, may be used as a shielding component. In other words, shielding component 200*a* according to the above-mentioned Variation 1 may exclusively include shock-absorbing component 204.

The placement positions of shielding component 200 are not limited to the placement positions illustrated in FIG. 3 and FIG. 4 or the like. As described earlier, shielding component 200 may be disposed in peripheral portion 110*a* in a lower edge of first panel 110. Shielding component 200 may be disposed in peripheral portion 110*a* in a left-most edge or a right-most edge of first panel 110. Furthermore, shielding component 200 may be disposed across the entire area or roughly the entire area of peripheral portion 110*a* of first panel 110. In other words, the placement position of shielding component 200 may be determined as needed with reference to a position, in display device 100, for which there is a high probability of collision with an object, for example.

In the above embodiment, wall portion 151 of housing 150 is bonded to first back surface 115 in peripheral portion 110*a* of first panel 110 by adhesive component 145. However, an edge (end surface toward the positive side of the Z-axis direction in FIG. 4, for example) of peripheral portion 110*a* may be bonded to side wall 151. Furthermore, when side wall 151 includes a frame portion positioned in front of peripheral portion 110*a*, the frame portion may be connected to first front surface 114 in peripheral portion 110*a* by adhesive component 145 or the like. In any case, since there is a need to meet the demand for the slimming down of bezels, for example, it is necessary to make the adhesion area between peripheral portion 110*a* and side wall 151 of housing 150 relatively small. Accordingly, when first panel 110 is, for example, subjected to excessive impact, a problem may occur in which glass substrate 121 included in second panel 120 is damaged, and peripheral portion 110*a* detaches from wall portion 151 of housing 150 (see FIG. 5 and FIG. 6, for example). Consequently, the structure, in which glass debris is prevented from escaping outside by shielding component 200, that is included in display device 100 according to the above embodiment, is also useful in a case where the connection position of peripheral portion 110*a* of first panel 110 and wall portion 151 is a position other than first back surface 115.

First panel 110 does not need to be a touch panel. First panel 110 may, for example, be a light-transmissive panel for protecting second panel 120, and furthermore, first panel 110 may be an optical component that applies some form of an optical effect on an image displayed by second panel 120. In other words, it is sufficient so long as first panel 110 is a component made of a material, such as resin or the like, that is less prone to cracking than glass, and less prone to scattering or forming sharp shards even if cracking were to occur, and so long as the material is transparent enough to allow an image displayed by second panel 120 to be viewable, the functions of first panel 110 are not particularly limited.

The size and shape of display device 100, for example, are not limited to the size and shape illustrated in FIG. 1 and FIG. 2 or the like. Display device 100 may, for example, be of a size or a shape that roughly allows it to be firmly held in one hand by a user. In this case, display device 100 may include a processor for executing various processes for such tasks as displaying images and communicating with other devices, as well as memory, a battery, and the like. In other words, display device 100 may be implemented as a mobile terminal.

Each of the additional notes on display device 100 according to the above embodiment may be applied to each of Variation 1 through Variation 3 of the embodiment. Forms obtained through various modifications to each of the foregoing embodiment and variations that may be conceived by those skilled in the art, as well as forms realized by combining elements and functions in each of the foregoing embodiment and variations without departing from the essence of the present disclosure are included within the scope of the present disclosure. Furthermore, arbitrary combinations of two or more of the claims, from among the plurality of claims described in the claims as originally filed, that are within the bounds of technical feasibility, are also included in the scope of the present disclosure.

Although the present disclosure has been described and illustrated in detail, it is clearly understood that the same is by way of example only and is not to be taken by way of limitation, the scope of the present disclosure being limited only by the terms of the appended claims.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The display device according to the present disclosure is applicable in a display device or the like provided in an aircraft, for example.

The invention claimed is:

1. A display device for use in an aircraft, the display device comprising:
- a first panel that is light-transmissive;
- a second panel that opposes a first back surface that is a back surface of the first panel and displays an image on a front surface of the second panel, the second panel including a glass substrate;
- a housing that defines a housing space and includes a side wall that supports a peripheral portion of the first panel, the housing space housing the second panel; and
- a shielding component that includes one end connected to the peripheral portion of the first panel, the shielding component including a portion that extends backward from the peripheral portion in an interior of the housing space, wherein
- an other end of the shielding component is positioned behind a second back surface that is a back surface of the second panel,
- the housing includes an opposing wall that opposes the second back surface,
- the other end is disposed between the second back surface and the opposing wall, and
- the shielding component includes:
- a shock-absorbing component that is a portion that extends backward from the peripheral portion; and
- a tabular component connected to the shock-absorbing component, the tabular component including the other end.

2. The display device according to claim 1, wherein
- an other end of the shielding component is a free end.

3. A display device for use in an aircraft, the display device comprising:
- a first panel that is light-transmissive;
- a second panel that opposes a first back surface that is a back surface of the first panel and displays an image on a front surface of the second panel, the second panel including a glass substrate;
- a housing that defines a housing space and includes a side wall that supports a peripheral portion of the first panel, the housing space housing the second panel; and
- a shielding component that includes one end connected to the peripheral portion of the first panel, the shielding component including a portion that extends backward from the peripheral portion in an interior of the housing space, wherein
- the shielding component is disposed in at least one of the peripheral portion in an upper edge of the first panel or the peripheral portion in a lower edge of the first panel,
- the housing includes two attachment portions that are portions to which an other object that is positioned behind the housing is attached,
- the two attachment portions are spaced apart from each other in a left-and-right direction, and
- a range of placement of the shielding component in the left-and-right direction includes a range spanning between the two attachment portions in the left-and-right direction.

4. The display device according to claim 3, wherein
- an other end of the shielding component is a free end.

5. A display device for use in an aircraft, the display device comprising:
- a first panel that is light-transmissive;
- a second panel that opposes a first back surface that is a back surface of the first panel and displays an image on a front surface of the second panel, the second panel including a glass substrate;
- a housing that defines a housing space and includes a side wall that supports a peripheral portion of the first panel, the housing space housing the second panel; and
- a shielding component that includes one end connected to the peripheral portion of the first panel, the shielding component including a portion that extends backward from the peripheral portion in an interior of the housing space, wherein
- the shielding component is disposed in at least one of the peripheral portion in an upper edge of the first panel or the peripheral portion in a lower edge of the first panel, and
- the shielding component is disposed across a range at least ⅓ and at most ½ a length of the housing in a left-and-right direction, the range including a central portion of the housing in the left-and-right direction.

6. The display device according to claim 5, wherein an other end of the shielding component is a free end.

* * * * *